United States Patent [19]

Larsen et al.

[11] Patent Number: 5,371,872
[45] Date of Patent: Dec. 6, 1994

[54] METHOD AND APPARATUS FOR CONTROLLING OPERATION OF A CACHE MEMORY DURING AN INTERRUPT

[75] Inventors: Larry D. Larsen, Raleigh; David W. Nuechterlein, Durham; Kim E. O'Donnell, Raleigh; Lee S. Rogers, Raleigh; Thomas A. Sartorius, Raleigh; Kenneth D. Schultz, Cary; Harry I. Linzer, Raleigh, all of N.C.

[73] Assignee: International Business Machines Corporation, Armonk, N.Y.

[21] Appl. No.: 783,551

[22] Filed: Oct. 28, 1991

[51] Int. Cl.[5] ............................................. G06F 12/08
[52] U.S. Cl. ........................................ 395/425; 395/650
[58] Field of Search .............................. 395/425, 650

[56] References Cited

U.S. PATENT DOCUMENTS

| | | | |
|---|---|---|---|
| 3,827,029 | 7/1974 | Schlofterer et al. | 364/200 |
| 4,001,783 | 1/1977 | Monahan et al. | 395/650 |
| 4,028,664 | 6/1977 | Monahan et al. | 395/275 |
| 4,075,686 | 2/1978 | Calle et al. | 364/200 |
| 4,190,885 | 2/1980 | Joyce et al. | 364/200 |
| 4,357,656 | 11/1982 | Saltz et al. | 364/200 |
| 4,386,402 | 5/1983 | Toy | 364/200 |
| 4,426,682 | 1/1984 | Riffe et al. | 364/200 |
| 4,504,902 | 3/1985 | Gallaher et al. | 364/200 |
| 4,635,186 | 1/1987 | Oman et al. | 395/575 |
| 4,730,248 | 3/1988 | Watanabe et al. | 364/200 |
| 4,811,209 | 3/1989 | Rubinstein | 364/200 |
| 4,814,981 | 3/1989 | Rubinfeld | 364/200 |
| 4,823,256 | 4/1989 | Bishop et al. | 395/575 |
| 4,831,581 | 5/1989 | Rubinfeld | 364/200 |
| 4,833,601 | 5/1989 | Barlow et al. | 364/200 |
| 4,864,492 | 9/1989 | Blakely-Fogal et al. | 395/54 |
| 4,881,163 | 11/1989 | Thomas et al. | 364/200 |
| 4,887,204 | 12/1989 | Johnson et al. | 395/600 |
| 4,896,291 | 1/1990 | Gest et al. | 395/156 |
| 4,930,106 | 5/1990 | Danilenko et al. | 364/200 |
| 5,014,240 | 5/1991 | Suzuki | 365/49 |
| 5,060,144 | 10/1991 | Sipple et al. | 364/200 |
| 5,091,845 | 2/1992 | Rubinfeld | 395/425 |
| 5,091,846 | 2/1992 | Sachs et al. | 395/250 |
| 5,119,484 | 6/1992 | Fox | 395/375 |
| 5,129,090 | 7/1992 | Bland et al. | 395/725 |
| 5,146,603 | 9/1992 | Frost et al. | 395/425 |
| 5,163,143 | 11/1992 | Culley et al. | 395/425 |

OTHER PUBLICATIONS

Harboe et al., "Multi-Tasking Using Coequal Multiple Microprocessors Having Memory-Lock Facilities" IBM Tech. Disc. Bull. vol. 24, No. 6 (Nov. 1981) pp. 2782-2785.

*Primary Examiner*—Thomas G. Black
*Assistant Examiner*—Peter Y. Wang
*Attorney, Agent, or Firm*—Bell, Seltzer, Park & Gibson

[57] ABSTRACT

The use of a high speed cache memory may be selectively controlled when a data processing task is interrupted in response to an interrupt signal, in order to prevent the interrupt from chilling the cache when insufficient performance enhancement will be realized. Disturbing the cache memory during performance of an interrupting task is prevented, thereby increasing the hit ratio of the cache when the interrupted task is resumed. Cache control information may be incorporated into a program status vector or program status word which is loaded into a program status register on occurrence of an interrupt.

27 Claims, 2 Drawing Sheets

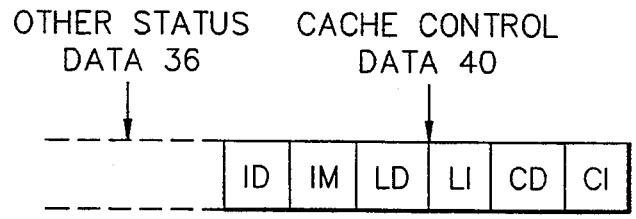

ID=0 FETCH DATA FROM CACHE OR MAIN MEMORY
 =1 FETCH DATA FROM MAIN MEMORY ONLY
IM=0 FETCH INSTRUCTIONS FROM CACHE OR MAIN MEMORY
 =1 FETCH INSTRUCTIONS FROM MAIN MEMORY ONLY
LD=0 DO NOT LOCK DATA IN CACHE
 =1 LOCK DATA IN CACHE
LI=0 DO NOT LOCK INSTRUCTIONS IN CACHE
 =1 LOCK INSTRUCTIONS IN CACHE
CD=0 DO NOT PLACE DATA IN CACHE
 =1 PLACE DATA IN CACHE
CI=0 DO NOT PLACE INSTRUCTIONS IN CACHE
 =1 PLACE INSTRUCTION IN CACHE

FIG. 3.

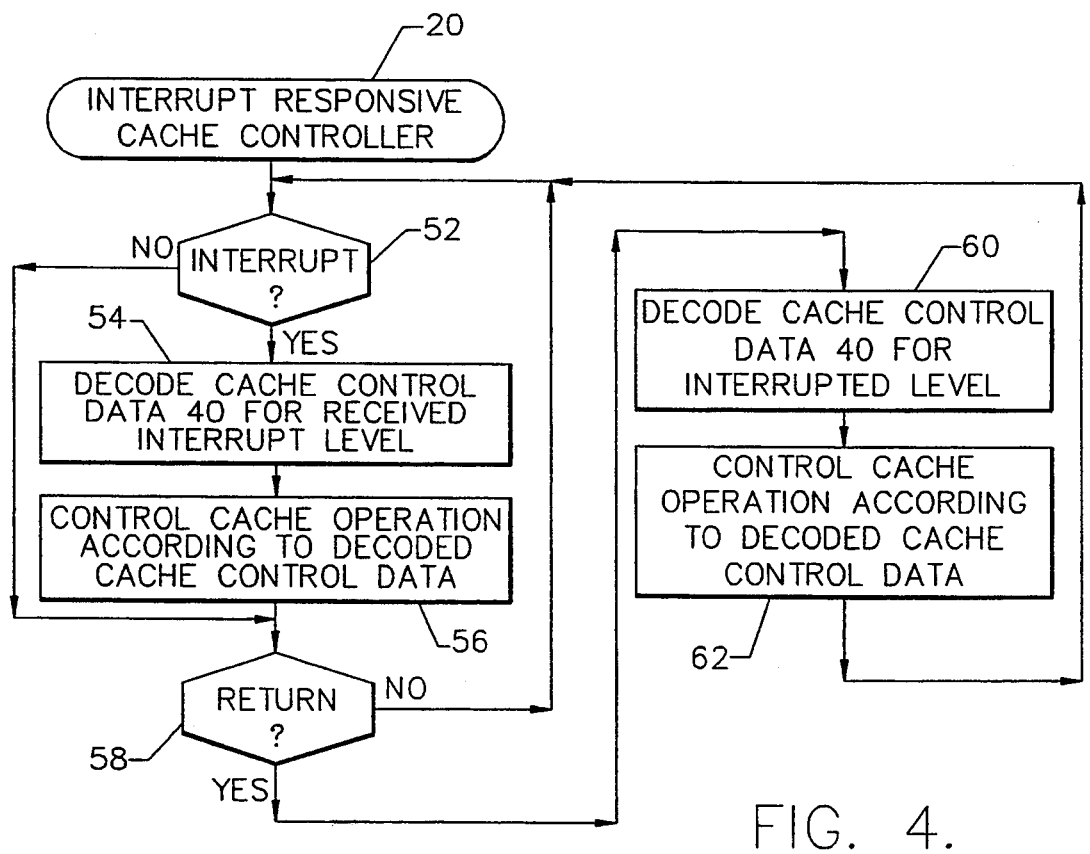

FIG. 4.

METHOD AND APPARATUS FOR CONTROLLING OPERATION OF A CACHE MEMORY DURING AN INTERRUPT

FIELD OF THE INVENTION

This invention relates to data processing systems, and more particularly to data processing systems which use relatively high speed cache memory in addition to relatively low speed main memory.

BACKGROUND OF THE INVENTION

Cache memory has long been used in data processing systems to decrease the memory access time for the central processing unit (CPU) thereof. A cache memory is typically a relatively high speed, relatively small memory in which active portions of a program and/or data are placed. The cache memory is typically faster than main memory by a factor of five to ten and typically approaches the speed of the CPU itself. By keeping the most frequently accessed instructions and/or data in the high speed cache memory, the average memory access time will approach the access time of the cache.

The active program instructions and data may be kept in a cache memory by utilizing the phenomena known as "locality of reference". The locality of reference phenomena recognizes that most computer program instruction processing proceeds in a sequential fashion with multiple loops, and with the CPU repeatedly referring to a set of instructions in a particular localized area of memory. Thus, loops and subroutines tend to localize the references to memory for fetching instructions. Similarly, memory references to data also tend to be localized, because table look-up routines or other iterative routines typically repeatedly refer to a small portion of memory.

In view of the phenomena of locality of reference, a small, high speed cache memory may be provided for storing a block of memory containing data and/or instructions which are presently being processed. Although the cache is only a small fraction of the size of main memory, a large fraction of memory requests over a given period of time will be found in the cache memory because of the locality of reference property of programs.

In a CPU which has a relatively small, relatively high speed cache memory and a relatively large, relatively low speed main memory, the CPU examines the cache when a memory access instruction is processed. If the desired word is found in cache, it is read from the cache. If the word is not found in cache, the main memory is accessed to read that word, and a block of words containing that word is transferred from main memory to cache memory. Accordingly, future references to memory are likely to find the required words in the cache memory because of the locality of reference property.

The performance of cache memory is frequently measured in terms of a "hit ratio". When the CPU refers to memory and finds the word in cache, it produces a "hit". If the word is not found in cache, then it is in main memory and it counts as a "miss". The ratio of the number of hits divided by the total CPU references to memory (i.e. hits plus misses) is the hit ratio. Experimental data obtained by running representative programs has indicated that hit ratios of 0.9 (90%) and higher may be obtained. With such high hit ratios, the memory access time of the overall data processing system approaches the memory access time of the cache memory, and may improve the memory access time of main memory by a factor of five to ten or more. Accordingly, the average memory access time of the data processing system can be improved considerably by the use of a cache.

Data processing systems are typically used to perform many independent tasks. When a task is first begun, the hit ratio of the cache is typically low because the instructions and/or data to be performed will not be found in the cache. Such a cache is known as a "cold" cache. Then, as processing of a task continues, more and more of the instructions and/or data which are needed may be found in the cache. The cache is then referred to as a "warm" cache because the hit ratio becomes very high.

In order to maximize the hit ratio, many data processing system architectures allow system control over the use of the cache. For example, the cache may be controlled to store instructions only, data only, or both instructions and data. Similarly, the cache may be controlled to lock a particular line or page in the cache, without allowing overwrites. The design and operation of cache memory in a data processing architecture is described in detail in Chapter 12 of the textbook entitled "Computer System Architecture" by Mano, Prentice-Hall (Second Edition, 1982).

Cache memory is often used in high speed data processing system architectures which also often include multiple interrupt levels. As is well known to those having skill in the art, an interrupt may be an "external" interrupt, for example from a keyboard, disk drive, or other peripheral unit, or may be an "internal" interrupt from an internally generated timer. Upon occurrence of an interrupt, a first (interrupted) task being performed in the data processing system is suspended and a second (interrupting) task is performed. The interrupted task may be resumed after completion of the interrupting task.

High performance data processing architectures often allow multiple virtual machines to perform independent tasks, with multiple interrupt levels available for each of the virtual machines. A Processor Status Word (PSW) is typically stored in the central processing unit to track the status of the processor, including the interrupt level in which the processor is operating. For complex data processing systems, a Processor Status Vector (PSV), comprising a plurality of processor status words, is typically used to track multiple priority interrupt levels.

In a multiple interrupt level virtual machine environment, a new processor status vector is typically loaded into a set of processor status registers when a new virtual machine begins processing. See, for example, U.S. Pat. No. 4,001,783 to Monahan et al., entitled *Priority Interrupt Mechanism*, which describes a high performance data processor using a cache memory and having eight levels of interrupts with a complete set of registers for each of the eight levels. When an interrupt causes the initiation of a new process, the current process is left intact in the registers assigned to that process level. Control may then be returned to the interrupted process simply by reactivating that process level. The need to store and restore register information concerning the interrupted processes is thereby eliminated, along with the accompanying overhead.

A similar system is described in U.S. Pat. No. 4,028,664 to Monahan et al., entitled *Apparatus For Data of the Highest Priority Process Having the Highest Priority Channel to a Processor*. Similarly, U.S. Pat. No. 4,823,256 to Bishop et al., entitled *Reconfigurable Dual Processor System*, describes a dual processor system using a cache memory for high speed memory operations. Each processor's hardware state is indicated by the contents of a program status word that stores software related information associated with the currently executing program.

Yet another example of a high performance virtual machine data processing architecture that uses a cache memory and multiple interrupt levels is described in U.S. Pat. No. 4,635,186 to Oman et al. entitled *Detection and Correction of Multi-Chip Synchronization Errors*, and assigned to the assignee of the present invention. In this patent, a high speed cache memory is used, and the interrupt level is controlled using a program status vector comprising a set of eight program status words for each virtual machine.

In summary, high speed cache memory and multiple interrupt levels are among the many features used to enhance the performance of a data processing system. When properly designed, the cache allows memory access at speeds approaching that of the central processing unit, even though most of the data and instructions are stored in lower speed main memory. When properly designed, multiple level interrupt systems allow ongoing processing to be interrupted on an as needed basis, to perform higher priority tasks. Multiple interrupt levels may also be used in a virtual machine environment, with each virtual machine including multiple levels of interrupts associated therewith. Accordingly, there is a continued need to improve the performance and operation of cache memory and interrupt handling in data processing system.

SUMMARY OF THE INVENTION

It is therefore an object of the present invention to provide a method and apparatus for improving the performance of a cache memory in a data processing system.

It is another object of the present invention to provide a method and apparatus for more effectively controlling interrupt processing in a data processing system.

These and other objects are provided according to the present invention, by an interrupt responsive cache controlling method and apparatus, which is responsive to interrupt signals. Interrupt responsive cache control prevents information storage in at least part of a cache memory when a first data processing task is interrupted by a second data processing task, to thereby prevent information in at least part of the cache from being disturbed during performance of the second data processing task.

The present invention stems from the realization that when an interrupt occurs, and use of the cache continues during the interrupting task, the new instructions and/or data will begin to displace the interrupted instructions and/or data in the cache. Thus, the interrupting task will chill the cache for the interrupted task, even if the interrupting task cannot advantageously use the cache. For example, when the interrupting task performs a relatively small number of instruction and/or data fetches, the cache provides no significant performance enhancement. More importantly, when the interrupting task performs a relatively large number of instructions and/or data fetches without locality of reference, then the interrupting task gains little advantage from the initial cache contents and also chills the cache for the interrupted task. If use of the cache continues during the second task, the new instructions and/or data (and instructions and data near the new instructions and data) will begin to displace the previously executing instructions and/or data, and will chill the cache when the interrupted task resumes operation.

According to the present invention, the interrupt responsive cache controller is responsive to interrupt signals, to prevent information storage in at least part of the cache during the performance of an interrupting task, and prevent at least part of the cache from being disturbed during performance of the interrupting task. At least part of the cache is thereby undisturbed when the interrupted task is resumed.

The cache may be controlled in a number of ways in response to the receipt of an interrupt signal. For example, an interrupting process may be prevented from placing instructions in the cache, from placing data in the cache or from placing instructions and data in the cache. Other disabling alternatives will be envisioned by those having skill in the art. For example, an interrupting process may be prevented from placing instructions, data, or instructions and data in the cache, only when the newly placed instructions and/or data will displace instructions and/or data already in the cache. An interrupting task is thereby prevented from chilling the cache when the cache operation provides insufficient performance advantage for the interrupting task.

In a data processing system which uses a program status word or program status vector for interrupt processing, cache control information may be included in the program status word or program status vector. Accordingly, in addition to the heretofore known uses of program status words or program status vectors for controlling the operation of a data processing system during an interrupt, additional information may be included to control the operation of the cache for each interrupt level. By providing cache control information in a program status word or program status vector, an interrupting task need not chill the cache for the interrupted task, if use of the cache provides little or no performance enhancement for the interrupting task.

The interrupting task starts execution by loading its program status word or program status vector. If the program status word or program status vector indicates total or partial disabling of the cache, execution proceeds at the interrupting level until concluded, without using all or part of the cache. At the conclusion of the interrupting task, control is returned to the interrupted task. The interrupted task starts execution by reloading its program status word or program status vector, which indicates the original cache control status. The contents of the cache have not been disturbed, and execution of the interrupted task resumes with a warm cache.

The interrupt responsive cache controlling method and apparatus of the present invention also permits execution of exception routines without disturbing the cache contents for main line processing. This can be accomplished by executing the exception routine at another interrupt level from the main line processing routine, where the other interrupt level includes a program status word or vector which is set to minimize cache disruption. Similarly, program check or hardware check interrupt levels may execute without disturbing cache contents, thus making the cache contents available for analysis during the program check or hardware check.

BRIEF DESCRIPTION OF THE DRAWINGS

FIG. 3 is a schematic representation of the cache control data of FIG. 2.

FIG. 4 is a flowchart representation illustrating operation of the interrupt responsive cache controller of FIG. 2.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
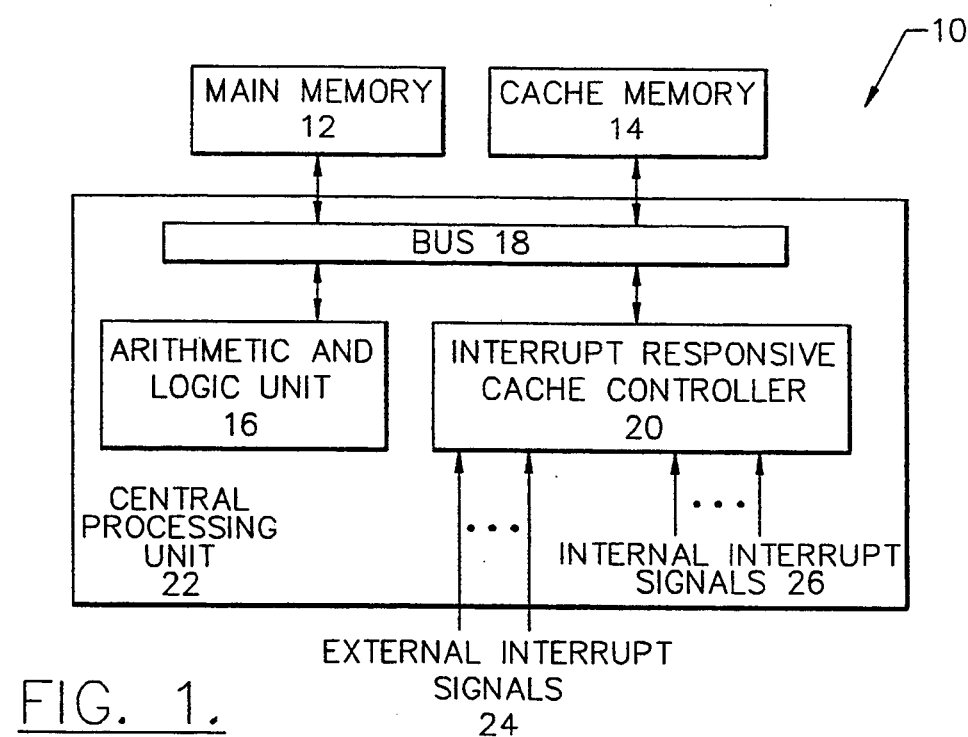
FIG. 1 is a schematic block diagram illustrating a data processing system including an interrupt responsive cache controller according to the present invention.

Referring now to FIG. 1, a data processing system including an interrupt responsive cache controller according to the present invention will now be described. As shown in FIG. 1, data processing system 10 includes a central processing unit (CPU) 22 which communicates with a main memory 12 and a cache memory 14. It will be understood by those having skill in the art that CPU 22 may include a plurality of processors in a multiprocessing system. In many typical embodiments, main memory 12 comprises Dynamic Random Access Memory (DRAM) and cache memory 14 comprises Static Random Access Memory (SRAM). As is well known to those having skill in the art, cache memory 14 is typically smaller than main memory 12, but is typically faster than main memory 12. Cache memory 14 is also typically more expensive than main memory 12 on a per byte basis.

Central processing unit 22 includes at least one Arithmetic and Logic Unit (ALU) 16, with the ALU communicating with main memory and cache memory via an internal bus 18. Other communications techniques between ALU 16, main memory 12 and cache memory 14 are well known to those having skill in the art, and the configuration shown in FIG. 1 is for illustrative purposes only.

Still referring to FIG. 1, data processing system 18 includes an interrupt responsive cache controller 20. Interrupt responsive cache controller 20 may be responsive to external interrupt signals 24 generated by peripherals such as keyboards, disk drives or communications ports. Interrupt responsive cache controller 20 may also be responsive to internal interrupt signals 26, generated by internal hardware or software timers or other known internal events. Known decoding means may be used to decode received interrupt signals according to well known priority schemes.

Interrupt responsive cache controller 20 responds to external and/or internal interrupt signals to suspend performance of a first (interrupted) task and to perform a second (interrupting) task. Controller 20 also prevents information storing in at least part of the cache 14 during performance of the second task, to thereby prevent at least part of the cache from being disturbed during the performance of an interrupting task. At least part of the cache is thereby undisturbed when the interrupted task is resumed so that the interrupted task does not resume with a cold cache.

It will be understood by those having skill in the art that many types and degrees of disabling may be provided by the interrupt responsive cache controlling means. In particular, when an interrupting task is able to realize performance gains by using the cache, the cache may not be disabled at all in response to the interrupt. Alternatively, the cache may be disabled from storing instructions for the interrupting task. In another alternative, the cache may be disabled from storing data for the interrupting task. In yet another alternative, regions of the cache may be locked from accepting new instructions or data from the interrupting task but other regions of the cache may be unlocked so that instructions and/or data may be placed therein. Other types of cache disabling will be apparent to those having skill in the art.

Figure 2:
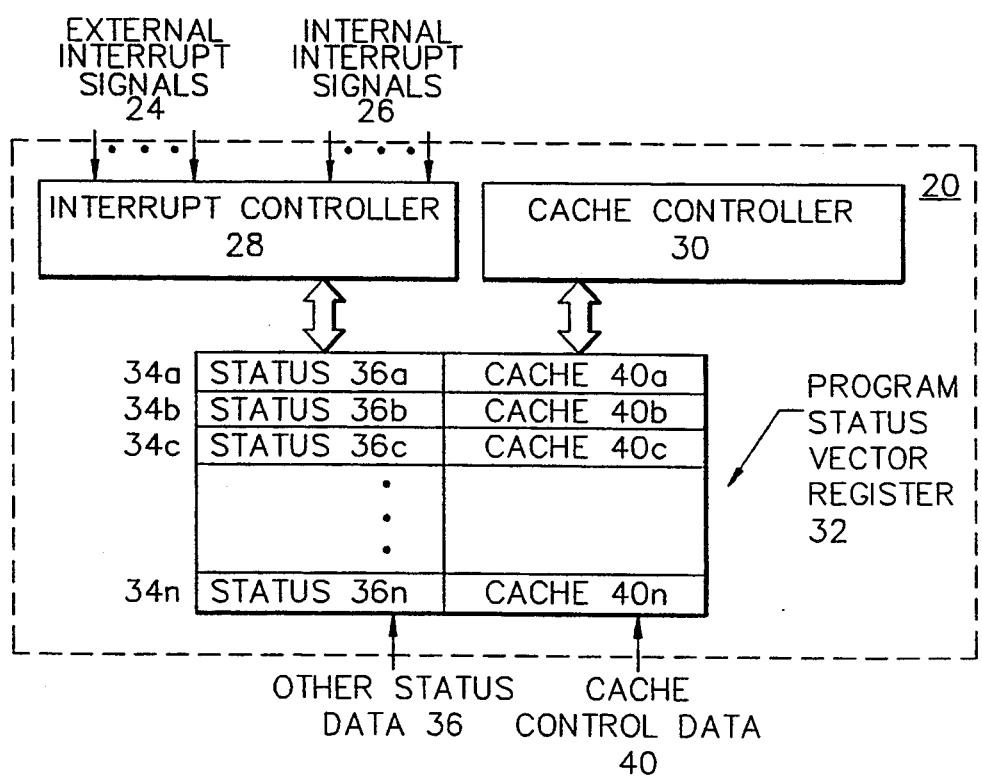
FIG. 2 is a detailed block diagram of the interrupt responsive cache controller of FIG. 1.

Referring now to FIG. 2, a detailed block diagram of interrupt responsive cache controller 20 will now be described. As shown in FIG. 2, controller 20 includes a program status vector register 32 for storing therein a series of program status words 34a–34n, with each program status word 34 corresponding to a program status for a particular interrupt level. Program status vectors are described in the aforesaid U.S. Pat. No. 4,635,186, the disclosure of which is hereby incorporated herein by reference. However, it will be understood by those having skill in the art that other data processing systems may use a single program status word, or other register configurations for program status words or vectors. An interrupt controller 28 is responsive to external interrupt signal 24 and/or internal interrupt signal 26 for loading one of the program status vectors 34 into cache controller 30, and for performing other interrupt related housekeeping functions, using techniques well known to those having skill in the art.

According to the invention, cache control data 40a–40n is included with each respective program status word 34a–34n. The cache control data indicates the manner in which the cache will be controlled during the associated interrupt. Cache controller 30 is responsive to the cache control data 40 to control the cache during an interrupt. It will be understood by those having skill in the art that cache controller 30 also performs other well known cache control functions such as storage of main memory data in cache memory upon a cache miss, replacement of altered cache data back into main memory and replacement of cache data when the cache is full. These other cache control functions are not described in detail herein.

Referring now to FIG. 3, a possible configuration for cache control data 40 is shown. This cache control data may be used with a program status vector controlled data processing system having multiple virtual processors, with each virtual processor being available at each interrupt level. As shown, cache control data 40 is illustratively six bits long with each bit described below. However, it will be understood by those having skill in the art that other configurations of cache control data may be used, depending on the desired interrupt responsive control requirements. It will also be understood by those having skill in the art that cache control data 40 need not be the rightmost bits in the program status vector 32, but may be located anywhere within the vector.

Still referring to FIG. 3, the "ID" bit indicates whether data can be fetched from cache or from main memory. When the cache is disabled for a particular interrupt level by setting the ID bit to 1, data cannot be read from the cache, but must be fetched from main memory. Similarly, the "IM" bit indicates that instructions cannot be fetched from cache memory. The ID and IM bits are particularly useful in executing a self-modifying program which could allow new information to be written over previously existing instructions in cache.

The "LD" bit indicates whether data is or is not locked in the cache. When the LD bit equals 1, data is locked in the cache and data cannot be overwritten in the cache. Similarly, the "LI" bit allows instructions to be locked from the cache, so that instructions in the cache cannot be overwritten.

The "CD" bit prevents storage of data in the cache regardless of whether an overwrite of existing data must take place. Similarly, the "CI" bit prevents placing of instructions in the cache regardless of whether an overwrite of existing instructions must take place. It will be understood that other cache controlling functions may be stored in additional cache control bits. Two or more bits may also be encoded to indicate multiple exclusive functions.

Referring now to FIG. 4, the operations performed by interrupt responsive cache controller will now be described. Cache controller 20 (FIG. 2) waits until an interrupt signal is received at block 52. When an interrupt signal is received, the cache control data 40 is decoded for the received interrupt level (block 54) and the cache is then controlled according to the decoded control data (block 56). The cache continues to operate according to the decoded cache control data until a return from the interrupting task is detected (block 58) or a new interrupt signal is received (block 52). When a return is detected, at block 58, the new cache control data for the interrupted level is decoded (block 60) and the cache is again controlled according to the original cache control data at block 62.

It will be understood by those having skill in the art that the cache control data 40 is loaded into program status vector register 32 along with the other status data 36 for the associated interrupt level or virtual processor. Accordingly, minimal additional overhead in terms of logic or storage is necessary for practicing the present invention.

It will also be understood by those having skill in the art that many configurations of program status words and program status vectors may be used with the interrupt responsive cache control method and apparatus of the present invention. In particular, a data processing architecture may include a single program status word register, into which a new program status word including cache control data, is loaded upon occurrence of an associated interrupt. Each time an interrupt occurs, the associated program status word is loaded into the program status register by the interrupt controller, and the cache control data included in the loaded program status word is used by the cache controller to control cache operation during the interrupt.

In another alternative, the data processing system architecture may include a program status vector register including at least one program status word register for each possible interrupt level. Upon processor initialization, a program status vector is loaded into the program status vector register. Upon occurrence of an interrupt, the interrupt controller points or refers to the associated program status word in the program status vector register, and the cache controller uses the cache control data in the associated program status word, to control cache operation during the interrupt. Reloading of program status word registers upon occurrence of an interrupt is not necessary.

In yet another alternative, a multiple virtual machine data processing system architecture may include a program status vector register including at least one program status word register for each possible interrupt level. Each virtual machine includes its own program status vector. When a virtual machine interrupts processing, its associated program status vector is loaded into the program status vector register. Interrupts are processed by the virtual machine by pointing to the associated program status word in the program status vector register. Reloading of the program status word vector is only necessary when another virtual machine takes over processing. The above alternatives are illustrative, and other interrupt handling architectures will be known to those having skill in the art.

By selectively controlling the operation of the cache in response to a received interrupt, chilling of the cache during an interrupting process may be prevented when insufficient performance enhancement is realized. The interrupted operation may thereby resume with a warm cache so that high hit ratios may be obtained immediately. In a multiple interrupt level environment, and in particular in a multiple virtual machine environment, the present invention insures that high hit ratios are maintained throughout processing.

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim:

1. A data processing system comprising:
   main memory means for storing information therein at relatively low speed;
   cache memory means for storing information therein at relatively high speed;
   means for generating a hardware interrupt signal in response to a hardware interrupt; and
   processing means for performing data processing tasks, said processing means being operatively connected to said main memory means and said cache memory means, said processing means including hardware interrupt responsive cache controlling means, responsive to said hardware interrupt signal, for controlling said cache memory means to perform a first data processing task, and to suspend performance of said first data processing task and perform a second data processing task in response to said hardware interrupt signal, and for controlling information storing in at least part of said cache memory means during said second data processing task which is performed in response to said hardware interrupt signal, to prevent said part of said cache memory means from being disturbed during performance of said second data processing task in response to said hardware interrupt signal.

2. The data processing system of claim 1 wherein said interrupt responsive cache controlling means comprises:
   a program status word, associated with said second task, said program status word including cache control information therein;
   a program status word register for storing therein said program status word including said cache control information;
   wherein said hardware interrupt responsive cache controlling means is responsive to said cache control information in said program status word register, for controlling information storing in said part of said cache memory means during performance of said second data processing task.

3. The data processing system of claim 1 wherein said processing means further includes arithmetic and logic means and wherein hardware interrupt responsive cache controlling means comprises:
   interrupt controlling means for controlling said arithmetic and logic means to perform said first data processing task and to suspend performance of said first data processing task and perform a second data processing task in response to said interrupt signal; and
   cache controlling means, responsive to said interrupt controlling means, for controlling information storing in at least part of said cache memory means during said second data processing task which is performed in response to said hardware interrupt signal, to thereby prevent said part of said cache memory means from being disturbed during performance of said second data processing task in response to said hardware interrupt signal.

4. The data processing system of claim 3 wherein said cache controlling means comprises means for selectively preventing storing of data in said cache memory means.

5. The data processing system of claim 3 wherein said cache controlling means comprises means for selectively preventing storing of instructions in said cache memory means.

6. The data processing system of claim 3 wherein said cache controlling means comprises means for selectively preventing storing of instructions and data in said cache memory means.

7. The data processing system of claim 3 wherein said cache controlling means comprises means for selectively preventing overwriting of data in said cache memory means.

8. The data processing system of claim 3 wherein said cache controlling means comprises means for selectively preventing overwriting of instructions in said cache memory means.

9. The data processing system of claim 3 wherein said cache controlling means comprises means for selectively preventing overwriting of instructions and data in said cache memory means.

10. A cache control method for a data processing system which generates a hardware interrupt signal in response to a hardware interrupt, said data processing system including main memory for storing information therein at relatively low speed, and cache memory for storing information therein at relatively high speed, said cache control method comprising the steps of:
    performing a first data processing task;
    receiving a hardware interrupt signal;
    interrupting performance of the first data processing task to perform a second data processing task in response to the received hardware interrupt signal;
    preventing at least part of the cache memory from being disturbed during performance of the second data processing task; and
    resuming performance of the first data processing task after performing the second data processing task;
    whereby part of the cache memory is undisturbed when performance of the first data processing task resumes.

11. The cache control method of claim 10 wherein said preventing step comprises the step of preventing storing of data in the cache memory during performance of the second data processing task.

12. The cache control method of claim 10 wherein said preventing step comprises the step of preventing storing of instructions in the cache memory during performance of the second data processing task.

13. The cache control method of claim 10 wherein said preventing step comprises the step of preventing storing of instructions and data in the cache memory during performance of the second data processing task.

14. The cache control method of claim 10 wherein said preventing step comprises the step of preventing overwriting of data in the cache memory during performance of the second data processing task.

15. The cache control method of claim 10 wherein said preventing step comprises the step of preventing overwriting of instructions in the cache memory during performance of the second data processing task.

16. The cache control method of claim 10 wherein said preventing step comprises the step of preventing overwriting of instructions and data in the cache memory during performance of the second data processing task.

17. The cache control method of claim 10:
    wherein said performing step comprises the step of loading a first program status word, including cache control data, into a program status register;
    wherein said interrupting step comprises the step of loading a second program status word, including cache control data, into the program status register;
    wherein said preventing step comprises the step of controlling operation of the cache memory according to the cache control data in the second program status word; and
    wherein said resuming step comprises the step of reloading the first program status word into the program status register.

18. The cache control method of claim 10:
    wherein said performing step comprises the step of loading a first program status vector, including cache control data, into a program status vector register;
    wherein said interrupting step comprises the step of loading a second program status vector, including cache control data, into the program status vector register;
    wherein said preventing step comprises the step of controlling operation of the cache memory according to the cache control data in the second program status vector; and
    wherein said resuming step comprises the step of reloading the first program status vector into the program status vector register.

19. A cache control method for a data processing system including main memory for storing information therein at relatively low speed, and cache memory for storing information therein at relatively high speed, said cache control method comprising the steps of:
- performing a first data processing task;
- receiving an interrupt signal;
- interrupting performance of the first data processing task to perform a second data processing task in response to the received interrupt signal;
- preventing at least part of the cache memory from being disturbed during performance of the second data processing task; and
- resuming performance of the first data processing task after performing the second data processing task;
- wherein said performing step is preceded by the step of loading a plurality of program status words, each including cache control data, into a program status register;
- wherein said performing step comprises the step of performing the first data processing task according to the information in a first one of the program status words;
- wherein said interrupting step comprises the step of performing the second data processing task according to the information in a second one of the program status words;
- wherein said preventing step comprises the step of controlling operation of the cache memory according to the cache control data in the second program status word; and
- wherein said resuming step comprises the step of resuming performance of the first data processing task according to the information in the first program status word;
- whereby part of the cache memory is undisturbed when performance of the first data processing task resumes.

20. A data processing system comprising:
- main memory means for storing information therein at relatively low speed;
- cache memory means for storing information therein at relatively high speed;
- arithmetic and logic means operatively connected to said main memory means and said cache memory means;
- program status word storing means, for storing therein a program status word including status data and cache control data, corresponding to the status of a program during an interrupt;
- interrupt controlling means operatively connected to said arithmetic and logic means and to said program status word storing means, for controlling operation of said arithmetic and logic means in response to said status data during an interrupt; and
- cache controlling means, operatively connected to said cache memory means and to said program status word storing means, for controlling information storing in said cache memory means in response to said cache control data during an interrupt;
- wherein said program status word storing means comprises a program status vector register for storing a plurality of program status words therein, each of which is associated with a predetermined interrupt level, and each of which includes status data and cache control data for the associated interrupt level;
- wherein said interrupt controlling means is responsive to an interrupt at one of said predetermined interrupt levels, for controlling said arithmetic and logic means in response to the status data for the associated interrupt level; and
- wherein said cache controlling means controls information storing in said cache memory means in response to the cache control data for the associated interrupt level;
- whereby information storing in said cache memory means is selectively controlled during an interrupt in response to the contents of said program status word storing means.

21. A data processing system comprising:
- main memory means for storing information therein at relatively low speed;
- cache memory means for storing information therein at relatively high speed;
- arithmetic and logic means operatively connected to said main memory means and said cache memory means;
- program status word storing means, for storing therein a program status word including status data and cache control data, corresponding to the status of a program during an interrupt;
- interrupt controlling means operatively connected to said arithmetic and logic means and to said program status word storing means, for controlling operation of said arithmetic and logic means in response to said status data during an interrupt; and
- cache controlling means, operatively connected to said cache memory means and to said program status word storing means, for controlling information storing in said cache memory means in response to said cache control data during an interrupt;
- wherein said data processing system comprises a multiple virtual machine data processing system;
- wherein said program status word storing means comprises program status vector register, for storing a plurality of program status words therein, each of which is associated with a predetermined interrupt level, and each of which includes status data and cache control data for the associated interrupt level;
- wherein said interrupt controlling means is responsive to an interrupt at one of said predetermined interrupt levels and for one of said multiple virtual machines, for storing a program status vector for said one virtual machine in said program status vector register, and for controlling said arithmetic and logic means in response to the status data for the associated interrupt level in said program status vector register; and
- wherein said cache controlling means controls information storing in said cache memory means in response to the associated cache control data;
- whereby information storing in said cache memory means is selectively controlled during an interrupt in response to the contents of said program status word strong means.

22. The data processing system of claim 20 wherein said cache control data comprises data for selectively preventing storing of data in said cache memory means.

23. The data processing system of claim 21 wherein said cache control data comprises data for selectively preventing storing of instructions in said cache memory means.

24. The data processing system of claim 20 wherein said cache control data comprises data for selectively preventing storing of instructions and data in said cache memory means.

25. The data processing system of claim 21 wherein said cache control data comprises data for selectively preventing overwriting of data in said cache memory means.

26. The data processing system of claim 20 wherein said cache control data comprises data for selectively preventing overwriting of instructions in said cache memory means.

27. The data processing system of claim 21 wherein said cache control data comprises data for selectively preventing overwriting of instructions and data in said cache memory means.

* * * * *

UNITED STATES PATENT AND TRADEMARK OFFICE
CERTIFICATE OF CORRECTION

PATENT NO. :   5,371,872
DATED      :   December 6, 1994
INVENTOR(S):   Larry D. Larsen et al.

It is certified that error appears in the above-identified patent and that said Letters Patent is hereby corrected as shown below:

Column 3, line 2, after "*For*" insert --*Dispatching*--.
      Column 5, line 55, please delete "18" and substitute --10-- therefor.
      Column 7, line 32, after "controller" please insert --20--.

Column 9, line 9, after ";" please insert --and--.
      Column 12, line 63, please delete "strong" and substitute --storing-- therefor.

Signed and Sealed this

Seventeenth Day of October, 1995

BRUCE LEHMAN

*Attest:*

*Attesting Officer*          *Commissioner of Patents and Trademarks*